US005135644A

United States Patent [19]

Süsse

[11] Patent Number: 5,135,644

[45] Date of Patent: Aug. 4, 1992

[54] BELT FOR MAGNETIC SEPARATOR

[75] Inventor: Wilhelm Süsse, Krefeld, Fed. Rep. of Germany

[73] Assignee: Krupp Industrietechnik Gesellschaft mit beschränkter Haftung, Duisburg, Fed. Rep. of Germany

[21] Appl. No.: 683,961

[22] Filed: Apr. 10, 1991

[51] Int. Cl.[5] .......................... B03C 1/22; B65G 15/44

[52] U.S. Cl. .................................... 209/225; 198/699; 198/844.2; 209/223.1

[58] Field of Search ...................... 209/636, 930, 223.1, 209/218, 223.2, 225; 198/844.2, 688.1, 690.2, 699

[56] References Cited

U.S. PATENT DOCUMENTS

| | | | |
|---|---|---|---|
| 2,753,980 | 7/1956 | Ballard | 198/494 |
| 2,875,887 | 3/1959 | Hinchcliffe | 198/699 |
| 2,930,478 | 3/1960 | Ruffino | 198/611 X |
| 3,147,850 | 9/1964 | Ronceray | 198/801 |
| 3,935,447 | 2/1976 | Barrett | 209/636 |
| 4,023,671 | 5/1977 | Kramer | 198/699 X |
| 4,034,617 | 7/1977 | Guyer | 198/844.2 X |
| 4,055,489 | 10/1977 | Soley | 209/223.2 |
| 4,125,191 | 11/1978 | Peace | 209/636 |
| 4,170,281 | 10/1979 | Lapeyre | 198/844.2 |
| 4,697,693 | 10/1987 | Rajala et al. | 198/699 |

FOREIGN PATENT DOCUMENTS

| | | |
|---|---|---|
| 1531962 | 1/1970 | Fed. Rep. of Germany . |
| 2601417 | 3/1977 | Fed. Rep. of Germany . |
| 2825207 | 1/1979 | Fed. Rep. of Germany . |
| 3533933 | 3/1987 | Fed. Rep. of Germany . |

OTHER PUBLICATIONS

Fordenhandkonstrktionen Fur Spezialzwecke, Erwin Bayer, Hamburg, pp. 647 & 648, no date.

*Primary Examiner*—Donald T. Hajec
*Attorney, Agent, or Firm*—Herbert Dubno

[57] ABSTRACT

A belt assembly for an overhead magnetic separator has a belt having an inner face and an opposite outer face and a pair of opposite ends one of which is cut away on the inner face and the other which is cut away on the outer face so that the cut-away portions can normally be lapped against each other to form the belt into an endless loop of substantially uniform thickness. The belt further is formed at the other end on the inner face with a shallow transverse inner groove. Respective flat inner and outer nonmagnetic strips engage the respective faces of the belt at its lapped ends with the inner strip lying in the groove. A plurality of nonmagnetic threaded studs fixed in the inner strip project through the lapped belt ends and through the outer strip and respective nonmagnetic nuts on the studs bear on the outer strip and clamp the lapped belt ends between the strips. A layer of elastomeric material is provided on the inner strip generally level with the inner belt face.

7 Claims, 3 Drawing Sheets

BELT FOR MAGNETIC SEPARATOR

FIELD OF THE INVENTION

The present invention relates to a magnetic separator. More particularly this invention concerns a belt for use in an overhead magnetic separator.

BACKGROUND OF THE INVENTION

A standard magnetic separator as described in German patent document 2,601,417 of J. Peace (claiming a British priority date of Sep. 5, 1975) and U.S. Pat. No. 4,055,489 of W. Soley comprises an overhead pickup belt that runs underneath a powerful magnet above a conveyor along which moves bulk material including magnetically attractable elements. Thus the magnetically attractable elements are pulled magnetically up off the conveyor belt to adhere to the pickup belt and are conveyed thereby normally transversely of the conveyor to a location offset from the conveyor where the pickup belt extends past its magnets, so that the elements are no longer held magnetically and drop off. This pickup belt is normally provided with transversely extending nonmagnetic cleats to aid moving the picked-up elements.

Such a belt is subjected to substantial wear. The elements it picks up frequently strike it with considerable force and even sometimes scrape along it. Furthermore the belt is advanced at a good speed and must bend at each end around the rollers it is spanned over.

Since it is standard to use such a magnetic separator underground in a mining operation to separate iron ores, it is essential to minimize service problems with it, as servicing such a bulky piece of equipment in a mine is extraordinarily difficult. Not only must wear and damage to the belt be minimized, but replacing the belt must also be a relatively simple project In systems such as described in U.S. Pat. No. 2,753,980 of L. Ballard, U.S. Pat. No. 2,875,887 of T. Hinchcliffe, U.S. Pat. No. 3,147,850 of R. Ronceray, and U.S. Pat. No. 4,697,693 of G. Rajala as well as in German patent document 3,533,933 of A. Jager the belt is annularly continuous and the conveying cleats are bolted to it in various manners. With such an arrangement when the belt is worn out, it can be cut off fairly easily, but complex equipment must be employed to fit a new endless belt over the rollers. Such belt replacement can take many hours of costly down time.

In German patent documents 1,531,962 of R. Gebhardt and 2,825,207 of E. Francois (claiming U.S. priority of application 814,357 filed Jul. 11, 1977) the belts are not continuous and complex hinge joints are provided to join them so that installing a new belt is fairly simple. Nevertheless, these joints subject the rollers to considerable wear and generate a great deal of noise. The wear is an obvious problem and the extra noise can mask other noises, such as a bad bearing scrape, to create further service problems. In U.S. Pat. No. 2,930,478 of D. Ruffino the ends of the belt are oppositely cut away and bolted together, but the joint is fairly weak since the reinforcement of the belt terminates to each side of it, and the bolt heads project uselessly from the belt.

OBJECTS OF THE INVENTION

It is therefore a object of the present invention to provide an improved belt for a magnetic separator.

Another object is the provision of such an improved belt for a magnetic separator which overcomes the above-given disadvantages, that is which is as strong as an endless belt but which ca be replaced easily.

SUMMARY OF THE INVENTION

A belt assembly for an overhead magnetic separator according to this invention has a belt having an inner face and an opposite outer face and a pair of opposite ends one of which is cut away on the inner face and the other which is cut away on the outer face so that the cut-away portions can normally be lapped against each other to form the belt into an endless loop of substantially uniform thickness. The belt further is formed at the other end on the inner face with a shallow transverse inner groove. Respective flat inner and outer nonmagnetic strips engage the respective faces of the belt at its lapped ends with the inner strip lying in the groove. A plurality of nonmagnetic threaded studs or bolts fixed in the inner strip project through the lapped belt ends and through the outer strip and respective nonmagnetic nuts on the studs bear on the outer strip and clamp the lapped belt ends between the strips. A layer of elastomeric material is provided on the inner strip generally level with the inner belt face.

The system according to this invention therefore has an extremely durable joint that can travel around the rollers silently and without subjecting the belt to excessive wear. It is possible by means of simple tools to install a new belt on the magnetic separator, even reusing everything except the worn-out belt. The belt is bored and cut away by the manufacturer so it can be made to very tight tolerances.

According to another feature of this invention a cleat extending transversely of the belt has a flange lying on the belt and traversed by the studs, the nuts bearing on the flange. This flange can in fact form the outer strip.

Furthermore in accordance with this invention the belt is formed in its outer face with an outer groove aligned with the inner groove and the outer strip is set in this outer groove. The strips can be vulcanized or secured by a cold adhesive to the respective belt ends.

To minimize loss of strength the belt is cut away by about half its width at each end and is provided with inner and outer layers of embedded reinforcement each lying under the respective face by a distance equal to between about one-quarter and one-third of the belt thickness measured between its faces. Thus in the joint region the belt will still have all the reinforcement it has over the rest of its length.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
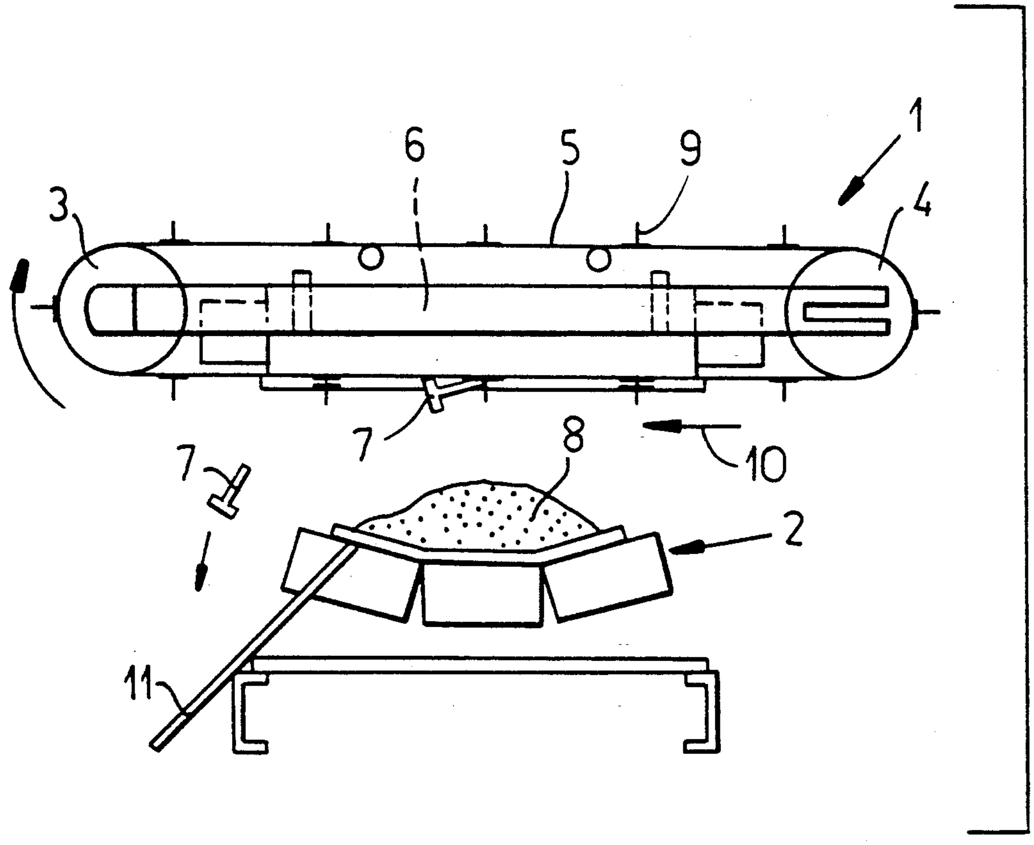
FIG. 1 is a partly diagrammatic side view of a separator according to the invention.

As seen in FIG. 1 a magnetic separator 1 is provided above a conveyor 2 and comprises a driven roller 3 and an idler roller 4 over which a belt 5 is spanned. Above the conveyor 2, which runs crosswise of the belt 5, the separator 1 is provided with a permanent or electromagnet 6 so that magnetically attractable elements 7 can be pulled out of the bulk material 8 being moved by the conveyor 2. These elements 7 are thus adhered to the belt 5 which is provided with crosswise conveying cleats 9 and the lower stretch or run of the belt 5 is moved by the drive roller 3 in the direction of arrow 10 to convey these picked-up elements 7 laterally off and drop them onto a sorting ramp 11.

Figure 2:
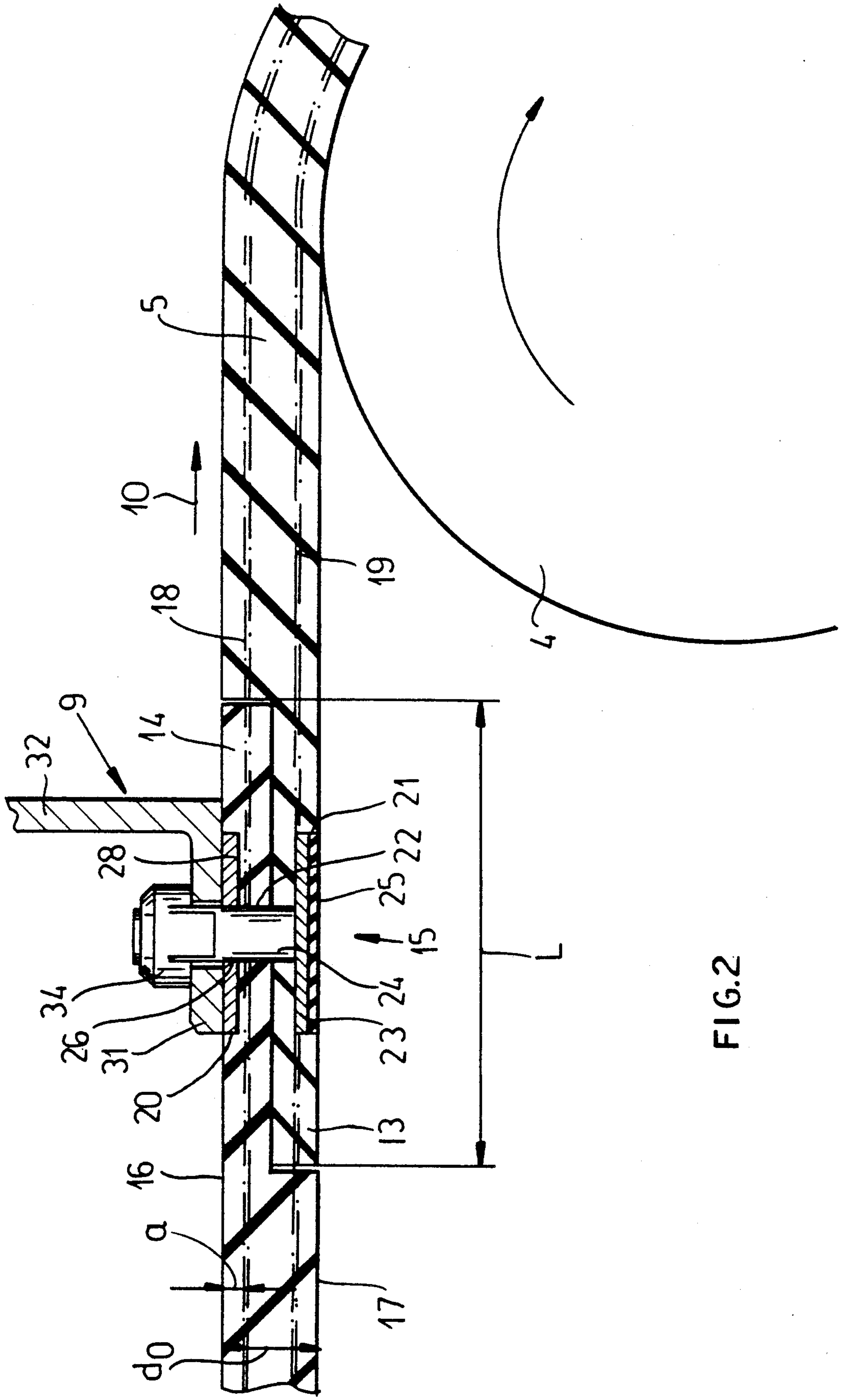
FIG. 2 is a large-scale sectional view of a detail of the separator.

FIG. 2 shows how the belt 5 has ends 13 and 14 cut away respectively at outer and inner belt faces 16 and 17 and secured together at these ends 13 and 14 by a bolted joint 15. The belt 5 is provided internally with inner and outer reinforcement layers 18 and 19, here glass fibers or cables, that are spaced under the respective belt faces 16 and 17 by a spacing a equal to between one-quarter and one-third of the thickness d of the belt 5. Thus both layers 18 and 19 of reinforcement run the full length L of the joint 15.

The outer belt face 16 is formed at the joint 15 with a shallow transverse outwardly open groove 20 and the inner face 17 is similarly formed with a shallow transverse inwardly open groove 21. A nonmagnetic stainless-steel strip 23 is recessed in the groove 21 and has welded-on studs 24 projecting from its outer face through holes 22 worked in the belt 5. A layer 25 of elastomeric material 25 is provided on the inner face of the strip 21 with a surface flush with the inner belt surface 17. An outer strip 28 formed with holes 26 aligned with the belt holes 22 is fitted in and fills the outer groove 20 so that the studs 24 project through these holes 26 also.

The cleat 9 provided at the joint 15 has one flange 31 lying on the outer face 16 over the strip 28 and an opposite upstanding flange 32. The studs 24 project up through holes in the flange 31 and carry lock nuts 34 that bear inward on the flange 31 and therefore pinch the belt ends 13 and 14 between the strips 23 and 28.

Figure 3:
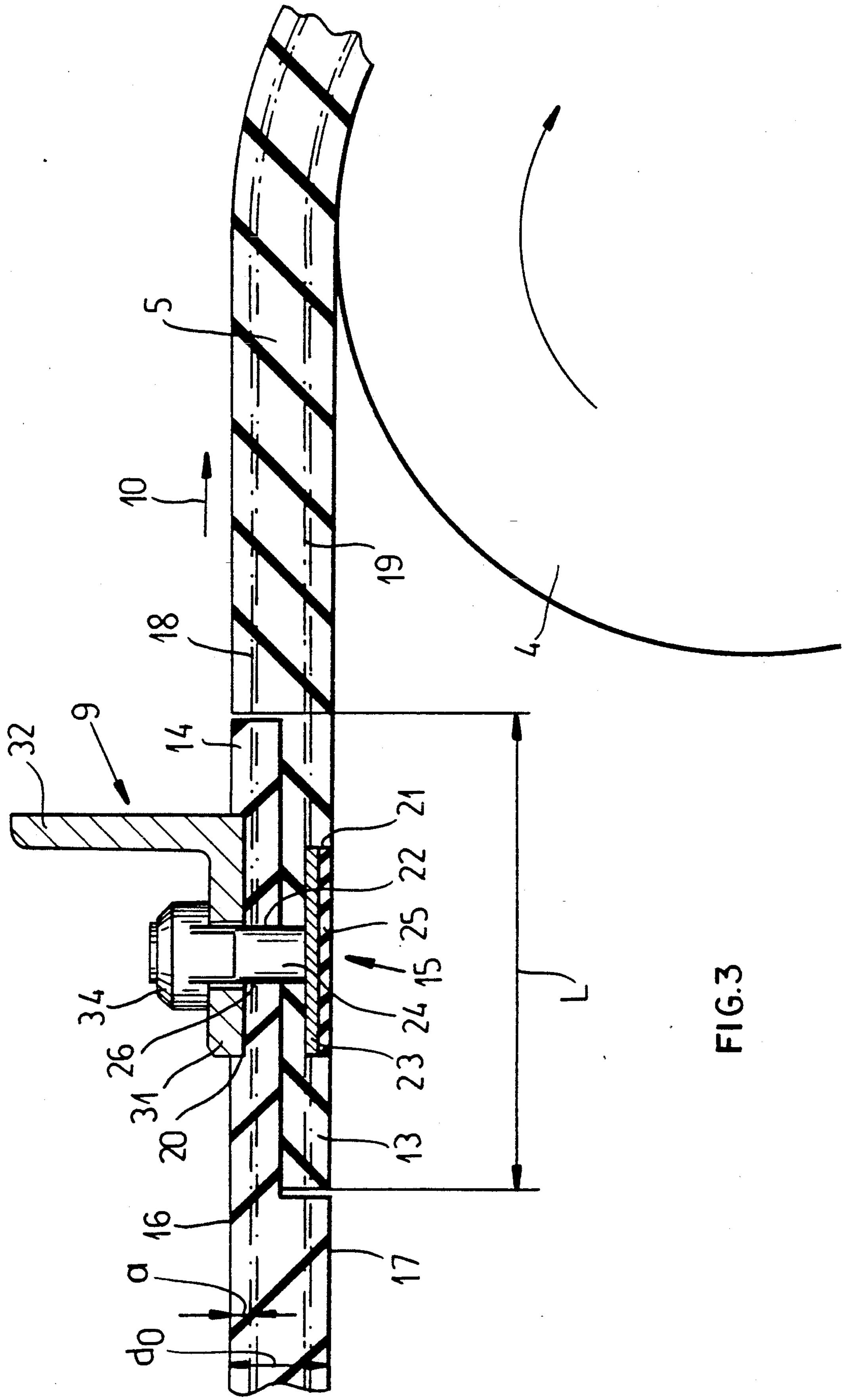
FIG. 3 is a view like FIG. 2 of an alternative arrangement according to the invention.

FIG. 3 shows how the strip 28 can be dispensed with and the flange 31 of the cleat 9 can be recessed in the groove 20, effectively replacing the strip 28.

I claim:

1. A belt assembly for an overhead magnetic separator, the assembly comprising:
   - a belt having an inner face and an opposite outer face and a pair of opposite ends, one of the ends being cut away on the inner face and the other of the ends being cut away on the outer face and the cut-away portions normally being lapped against each other so that the belt forms an endless loop of substantially uniform thickness, the belt further being formed at the other end on the inner face with a shallow transverse inner groove;
   - respective flat inner and outer nonmagnetic strips at the respective faces of the belt at its lapped ends, the inner strip lying in the groove;
   - a plurality of nonmagnetic studs fixed in the inner strip and projecting through the lapped belt ends and through the outer strip;
   - respective nonmagnetic nuts on the studs bearing on the outer strip and clamping the lapped belt ends between the strips; and
   - a layer of elastomeric material on the inner strip generally level with the inner belt face.

2. The belt assembly defined in claim 1, further comprising
   - a cleat extending transversely of the belt and having a flange lying on the belt and traversed by the studs, the nuts bearing on the flange.

3. The belt assembly defined in claim 2 wherein the flange forms the outer strip.

4. The belt assembly defined in claim 1 wherein the belt is formed in its outer face with an outer groove aligned with the inner groove, the outer strip being set in the outer groove.

5. The belt assembly defined in claim 1 wherein the strips are vulcanized to the respective belt ends.

6. The belt assembly defined in claim 1 wherein the strips are secured adhesively to the respective belt ends.

7. The belt assembly defined in claim 1 wherein the belt is cut away by about half its width at each end, the belt being provided with inner and outer layers of embedded reinforcement each lying under the respective face by a distance equal to between about one-quarter and one-third of the belt thickness measured between its faces.

* * * * *